United States
Marantette

[11] 3,930,150
[45] Dec. 30, 1975

[54] APPARATUS FOR DETERMINING THE CENTROID OF A LIGHTED HOLE

[75] Inventor: William F. Marantette, Torrance, Calif.

[73] Assignee: Digital Systems, Inc., Arcadia, Calif.

[22] Filed: Dec. 23, 1974

[21] Appl. No.: 536,038

[52] U.S. Cl............. 250/203 R; 250/236; 356/172
[51] Int. Cl.² ........................................... G01J 1/20
[58] Field of Search........ 250/203 R, 234, 236, 202; 356/172, 152

[56] References Cited
UNITED STATES PATENTS

| | | | |
|---|---|---|---|
| 3,293,439 | 12/1966 | Marantette et al. | 250/203 |
| 3,346,739 | 10/1967 | Jenkner | 250/234 X |
| 3,458,651 | 7/1969 | Dryden | 250/234 X |
| 3,517,204 | 6/1970 | Mahlo et al. | 250/236 X |
| 3,532,892 | 10/1970 | Murphy | 356/152 X |
| 3,535,525 | 10/1970 | Minrowitz | 356/172 X |
| 3,716,716 | 2/1973 | Marantette | 250/203 R |

*Primary Examiner*—Walter Stolwein
*Attorney, Agent, or Firm*—Gardner and Anten

[57] ABSTRACT

Apparatus for determining the centroid of a lighted hole in a master template and recording the rectangular coordinates of the centroid comprising a rotating member having a photovoltaic chip radially disposed thereon is disclosed. A light source is passed through the subject hole in the master template, and focused on the photovoltaic chip. The value of the current generated by the photovoltaic chip which is proportional to the incident light on the chip, is periodically sampled and compared for controlling the movement of the support table upon which the master template rests.

8 Claims, 5 Drawing Figures

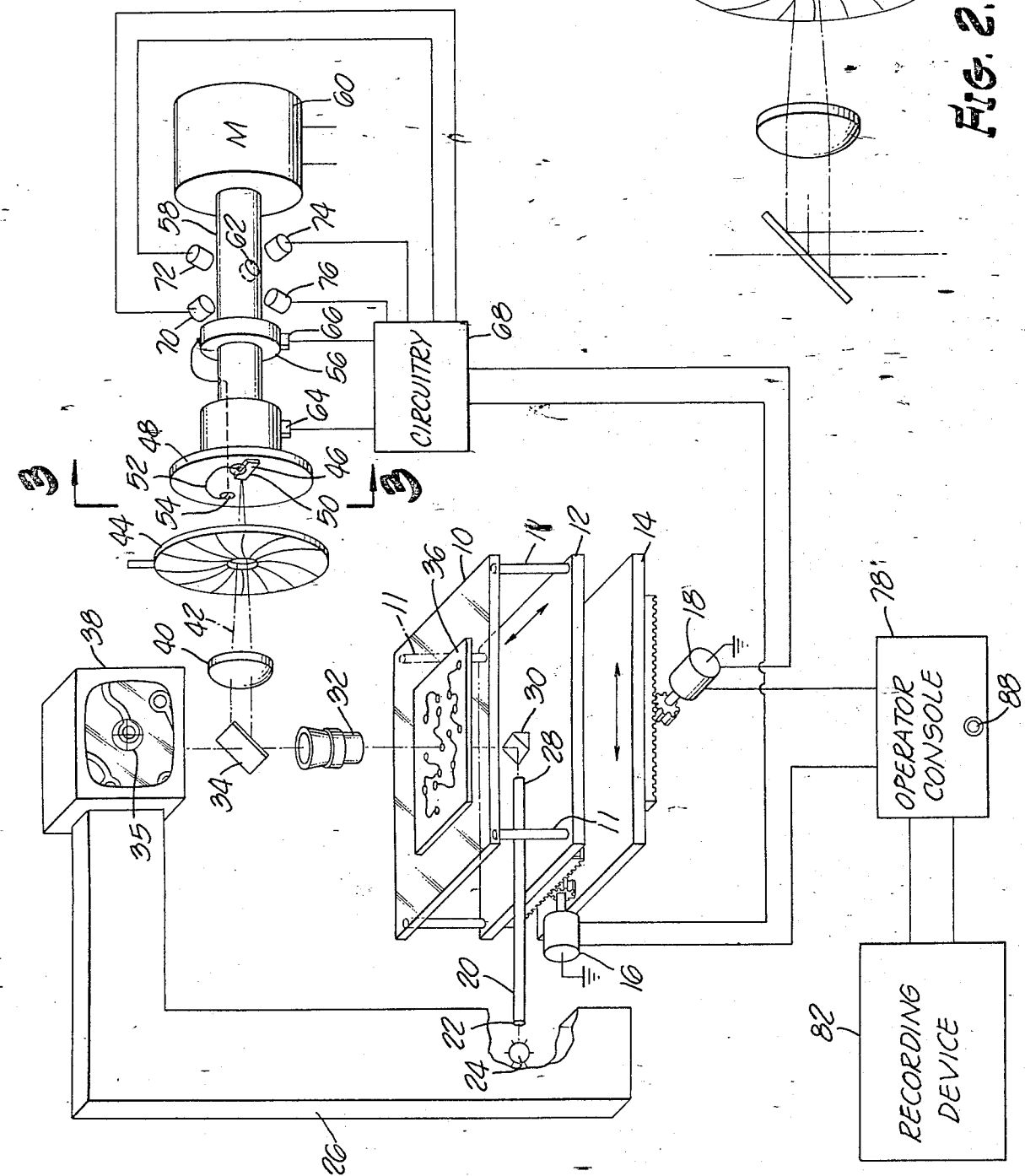

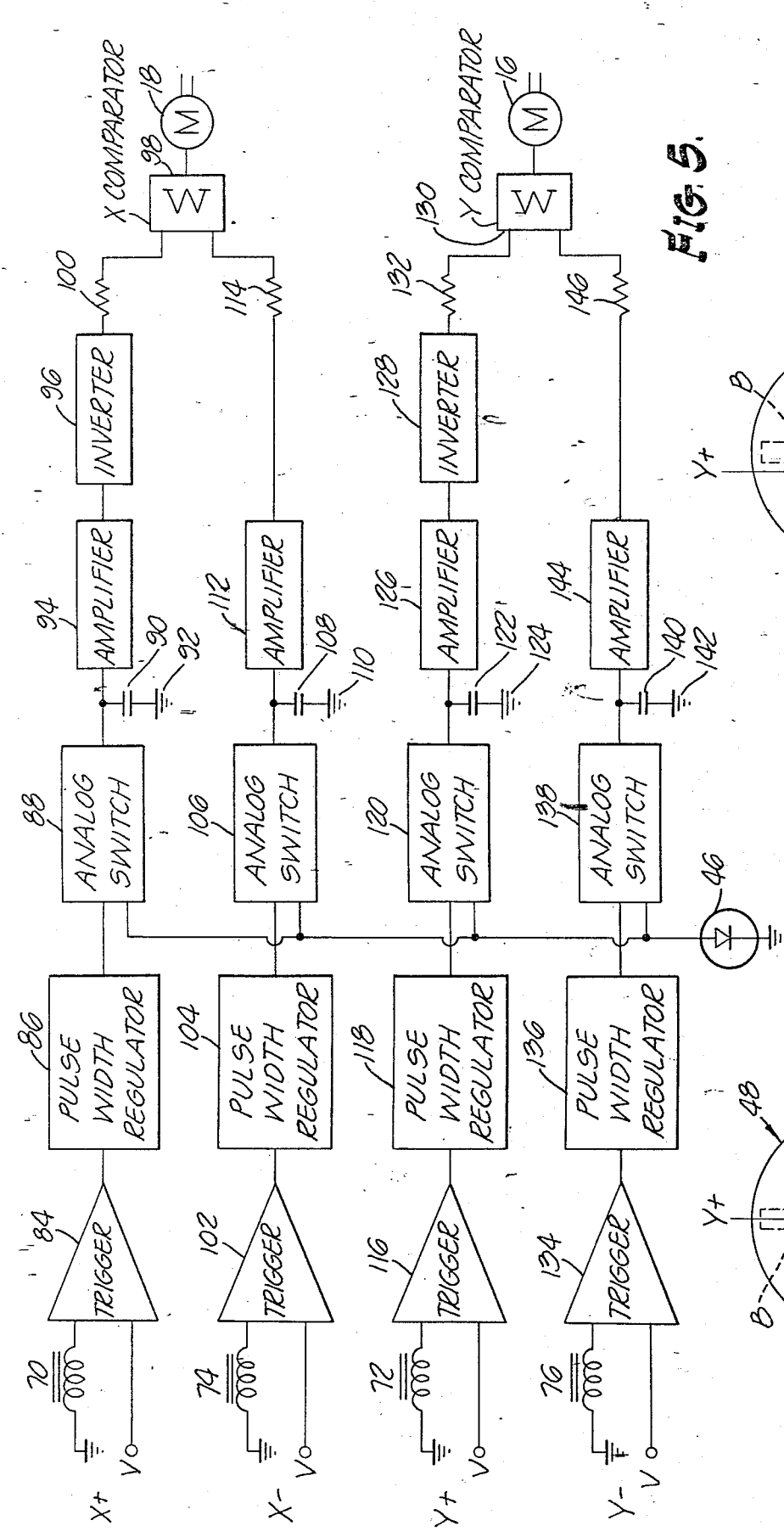
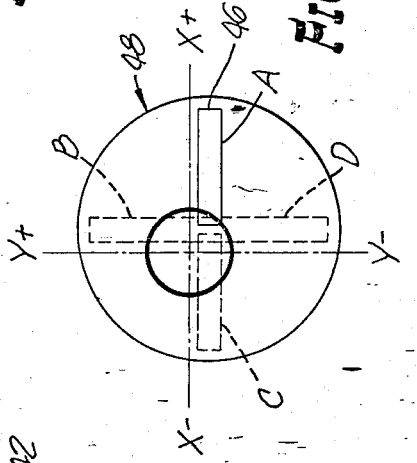
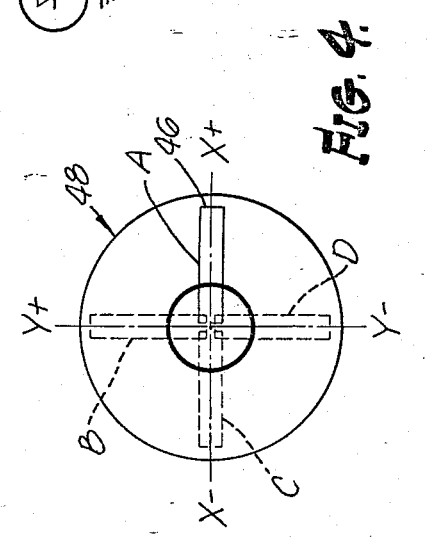

APPARATUS FOR DETERMINING THE CENTROID OF A LIGHTED HOLE

BACKGROUND OF THE INVENTION

The present invention relates broadly to apparatus and electrical circuitry for determining the centroid of a hole on a printed circuit master template. A master template is located on support tables moveable in the X-Y coordinate plane. The coordinates of the centroid of the hole are determined and may be recorded on punch tape or on another recording media for later use, such as in an automatic machining operation, or may be used to control the location of a drill tool.

The prior art apparatus, such as disclosed in Marantette U.S. Pat. Nos. 3,716,716 and 3,293,439 have used support tables moveable in an X-Y coordinate plane controlled by the output of a photo-sensitive material to determine the center of a hole. In Marantette U.S. Pat. No. 3,293,439 a light is focused upon a photo-sensitive material symmetrically positioned so as to form an electrical bridge. The outputs of the opposite sides of the bridge control operate appropriate servo motors for moving the table in either an X or Y plane until a null or balance point is achieved.

In Marantette U.S. Pat. No. 3,716,716 light is passed through the center of the subject hole and then through a rotating slot onto a plate of photo-sensitive material. The slot and plate are rotated and the output of the photosensitive material is sampled in each of its quadrants as the light passing through the slot hits the photo-sensitive material. When the output of each quadrant is the same then the centroid of the circle or hole desired is located.

The device of the Marantette U.S. Pat. No. 3,716,716, however, required rotating the slotted member at very high speeds in order to sample the photo-sensitive element. At such speeds of rotation any inbalance of its rotating slot would result in defective operation of the device.

The device of Marantette U.S. Pat. No. 3,716,716 sampled quadrants of the plate of photo-sensitive material by first determining the location of the first quadrant of the material and relying upon an electronic timing wave to determine the precise location of the slot relative to the remaining three quadrants. Temperature variations and other variables of the electrical components could result in possible distortion of the timing wave resulting in false information being fed to the servo motors, thus providing false coordinates for the centroid of the hole.

BRIEF DESCRIPTION OF THE PRESENT INVENTION

In the present invention a light source mounted in the support chassis is passed between the support tables through an acrylic tube to a 90° prism which directs the light through the subject hole located on a master template. The image of the hole is focused through an object lens to a split prism located above the master template. The split prism is set at a 45° angle to the horizontal. A portion of the image travels through the split prism where it is magnified to approximately 20 times size image for display on a viewing screen. The image is also deflected by the split prism 90° through a focusing lens and magnified to three times size. The image of the subject hole passes through an aperture and is focused upon a conductive disc having a photovoltaic chip in the form of a strip mounted radially on the disc.

The disc is rotated at approximately 25,000 RPM, the photovoltaic chip generating a voltage in response to the amount of light impinging upon it. Appropriate circuitry determines the position of the photovoltaic chip and periodically samples the output voltage of the photovoltaic chip. The output voltage of the photovoltaic chip at one location is compared to the output voltage at a location 180° of rotation away and is used to operate servo motors for controlling the position of the template on the support table. Once the centroid of the subject hole has been determined the coordinates of the centroid are recorded on appropriate recording media, such as a magnetic or paper tape. Servo motors can also be used to position a drilling tool and support tables for drilling.

OBJECTS

Accordingly, it is an object of the present invention to provide apparatus for rapidly determining the centroid of a lighted hole.

It is a further object of the present invention to provide apparatus for determining the centroid of a lighted hole more rapidly than previously available.

It is a further object of the present invention to provide apparatus for determining the centroid of a lighted hole which is more reliable and less susceptible to errors than previous devices.

These and other objects of the present invention will be evident from the following description of the invention and the accompanying drawing of which:

FIG. 1 is a perspective view of the two axis positioning system of this invention for determining the rectangular coordinates of the centroid of a lighted circle.

FIG. 2 is an enlarged perspective view of the optical assembly of the present invention with the subject hole image focused on the photovoltaic chip.

FIG. 3 is a plan view of the optical assembly viewed along sections lines 3—3 of FIG. 1 showing the image focused on the photovoltaic element indicating an off-center position.

FIG. 4 is a plan view of the optical assembly viewed along sections lines 3—3 of FIG. 1 showing the image focused on the photovoltaic element indicating the centroid of the subject hole.

FIG. 5 is a schematic of electrical circuitry for sampling and comparing the output voltage of the photovoltaic element.

Referring to FIG. 1 there is shown a master template support table 10, at least a portion of which is of a transparent material such as glass or plastic. It is preferable that such material be non-reflective. The template support table 10 is fixedly mounted by supports 11 on and parallel to base tables 12 and 14 which are moveable in the X and Y coordinates in response to servo motors 16 and 18. An acrylic tube 20 is located between the template support table 10 and the upper base table 12. One end 22 of the acrylic tube is aligned with and in close proximity to a light source such as a bulb 24 mounted in the support chassis 26. At the other end 28 of the acrylic tube 20 is fixed a 90° prism 30. Above and in alignment with the 90° prism is located an object lens 32 for focusing the light through a partially reflective mirror and or split prism 34 positioned at a 45° angle to the horizontal. The object lens 32 has cross hairs 35 on its surface for visually indicating the center of a hole. Template 36 is located at the focus of the object lens 32. Template 36 is a film defining the image of a hole such as disclosed in the aforementioned patent 3,716,716.

The partially reflective mirror or split prism 34 allows a portion of the light image to pass through it where it is magnified to approximately 20 times size and viewed on viewing screen 38 fixed to chassis 26. Perpendicular to the axis of the object lens 32 is a focusing lens 40 mounted in alignment with the central axis 42 of a variable aperture 44 positioned in front of a photo-sensitive element 46 in the form of a strip mounted radially on a conductive disc support assembly 48. The photosensitive element is, in the preferred embodiment, a silicone photovoltaic chip which is commercially available.

The bottom surface of the photovoltaic chip is placed in electrical contact with the surface of conductive disc 48 and the photovoltaic chip 46 has provided along its top surface a tap point 50 for connection to a lead wire 52. The lead wire 52 is passed through an insulated hole 54 within the conductive disc and support assembly and connected to bushing terminal 56 insulated from the conductive disc 48.

The conductive disc support assembly 48 and bushing terminal 56 are fixedly mounted upon a shaft 58 which is rotated by a motor 60. A metal pickup slug 62 is fitted radially within the shaft 58, and extending to the circumferential surface of the shaft 58.

A pair of pickup brushes 64 and 66 are provided for picking up the electrical signal generated by the photovoltaic chip in response to light or other radiation impinging upon the photovoltaic chip. The electrical signal picked up by brushes 64 and 66 form one input to the control circuitry 68. Four pickup coils, 70, 72, 74 and 76, are positioned symmetrically 90° apart from one another around the outer circumference of shaft 58. The coils 70-76 are mounted sufficiently close enough to the slug 62 so as to have a current generated in the pickup coils 70-76 when the slug 62 is aligned with one of the coils. The coils 70-76 are connected to the input of the control circuitry 68. The output of the control circuitry 68 serves to activate the servo motors 16 and 18 so as to move the template 36 to properly center the subject hole.

An operator console 78 has controls for manually moving the template support 10 by controlling servo motors 16 and 18. When the subject hole is properly aligned and centered a light 80 on the console 78 indicates that the centroid of the subject hole has been determined. The operator would then activate the recording device 82 to record the X and Y coordinates of the centroid of the subject hole.

Referring to FIG. 5 the control circuitry is shown in greater detail. Coil 70, positioned so as to be responsive to the metal slug 62 when the photovoltaic chip 46 is aligned with the positive X coordinate, is connected to a conventional Schmitt trigger circuit 84. The output of the Schmitt trigger is connected to the input of a pulse width regulator 86. The output of the pulse width regulator is connected to one input of analog switch 88, the second input to the analog switch being the output of photovoltaic chip 46. The output of the analog switch is connected to the positive plate of capacitor 90 which grounded at 92 and to the input of high impedance amplifier 94. The output of amplifier 94 is connected to inverter 96, the output of the inverter 96 being connected to X comparator 98 through resistor 100. The output of X comparator 98 is connected to electrically reversible servo motor 18 for controlling the X coordinate movement of the support table 14.

Coil 74, responsive to the metal slug 62 when the chip 46 is aligned with the negative X coordinate direction, is connected to the input of Schmitt trigger 102, the output of which is connected to the input of a pulse width regulator 104. The output of the pulse width regulator 104 is one input to analog switch 106, the second input being the output of the photovoltaic chip 46. The output of the analog switch 106 is connected to the positive plate of capacitor 108 which is grounded at 110, and to the input of amplifier 112. The output of amplifier 112 is connected through resistor 114 to the second input of X comparitor 98.

In a like manner coil 72 aligned with the positive Y coordinate is connected to a Schmitt trigger 116, a pulse width regulator 118 to an analog switch 120 having a second input from the output of the photovoltaic chip 46. The output of the analog switch 120 is connected to capacitor 122 grounded at 124 and to an amplifier 126, an inverter 128 and to Y comparitor 130 through resistor 132. The output of Y comparitor 130 operates electrically reversible servo motor 16.

Coil 76, indicative of the negative Y coordinate, is also connected to a Schmitt trigger 134, a pulse width regulator 136, an analog switch 138, which has its second input connected to the output of the photovoltaic chip 46. The output of the analog switch 138 is connected to the positive plate of capacitor 140 grounded at 142, to amplifier 144 and through resistor 146 to Y comparator 130.

With the foregoing description of the drawing, the operation of the device is as follows:

The master template 36 is positioned on the template support table 10. Light from light bulb 24 passes through the acrylic tube 20 and is directed at a 90° angle by prism 30 through the master template 36, through object lens 32, where the light image is split, a portion being magnified for viewing on viewing screen 38 and the remainder being directed to the optical assembly including the photovoltaic chip 46.

The operator at console 78 moves the base tables 12 and 14 until cross hairs located on object lens 32 are within any part of the subject hole on the template when viewed on the viewing screen 38. The image of the subject hole diverted by the partially reflective mirror or split prism 34 passes through focusing lens 48 where it is focused upon the photovoltaic chip 46 mounted on conductive disc assembly 48. The image of the light rays pass through the aperture of member 44.

The size of aperture of member 44 is variable and is made large enough so that it does not interfere with the focusing of the light image of the subject hole on the conductive disc 46. The aperture must be small enough, however, so that light from an image not within the subject hole will not be permitted to be focused on the photovoltaic chip 46. Since the width of the outline of the subject hole will vary from use to use a means of providing a variable sized aperture is desirable. A plurality of separate plates having different sized aperture could be inserted in a slot in the frame. In the preferred embodiment of the present invention a variable sized aperture consisting of a plurality of overlapping plates forming a shutter is used.

Referring to FIGS. 2 through 4, the image of the subject hole projected on the conductive disc 48 and photovoltaic chip 46 is illustrated. In FIG. 2 the light image is shown by solid line 148 being projected on the conductive disc 48 when the centroid of the subject hole is exactly below the object lens 32. In FIG. 3, a plan view taken along section lines 3—3 of FIG. 1, illustrates the image on the conductive disc 48 when the subject hole is centered.

The dotted lines 150 of FIG. 2 illustrate the image of the subject hole when the subject hole is not centered below the object lens 32. FIG. 4 is a plan view taken along lines 3—3 of FIG. 1 with the subject hole not centered.

The electrical signal by the photovoltaic chip 46 will be dependent upon the amount of light upon the photovoltaic chip. Referring to FIG. 3 the photovoltaic chip is shown with the subject hole of the master template 36 positioned off-centered resulting in its image focused upon the disc assembly 48 also being off-centered. In FIG. 3 position A, shown in solid lines, indicates the starting point along coordinate positive X of the photovoltaic chip. Position B of the chip 46, shown by dotted lines in FIG. 3, indicates the position of the photovoltaic chip 46 after it has rotated 90° from the starting point A. Position C indicates the location of the chip 46 after 180° of rotation and position D after 270° of rotation.

The electrical signal generated by the photovoltaic chip 46 in position A of FIG. 3 is less than the voltage generated by the photovoltaic chip 46 when it is in position C on the negative X coordinate. Similarly, the electrical signal generated by the photovoltaic chip 46 when in position B along the positive Y coordinate axis is greater than that generated by the photovoltaic chip 46 when compared to position D along the negative Y coordinate axis. By sampling and comparing the value of the signals generated by the photovoltaic chip when at position A with its value at position C, and the value at position B with that at position D, it can be determined whether the image of the lighted hole is centered on the photovoltaic chip 46. Only when the electrical signal of the photovoltaic chip 46 in position A is equal to the signal of the photovoltaic chip in position C and the signal in position B equals the signal at position D will the centroid of the lighted hole be below the object lens 32.

The electrically reversible servo motors 16 and 18 are responsive to the different electrical signals between positions A and C and positions B and D, and move the base tables 12 and 14 to a position where the electrical signals of the photovoltaic chip 46 are all equal such as shown in FIG. 4.

The control circuitry 68 samples the electrical signal generated by the photovoltaic chip 46 at each of the positions A, B, C, and D, and then compares the signals at position A with position C for controlling servo motor 18 and the signal generated at position B with that of D for controlling servo motor 16.

The control circuitry 68 operates as follows: Coil 70 along the positive X axis is activated by slug 62 coming into proximity with it, generating a current which activates trigger 84. The output of trigger 84 is a pulse wave form. The pulse wave form is regulated by pulse width regulator 86 so as to provide a single pulse of uniform width. The pulse of uniform width is then fed to one input of analog switch 88. The output of photovoltaic chip 46 is the second input of analog switch 88. Only during the time that the pulse from the regulator 86 is present as an input to the analog switch 88 will the switch 88 act as a closed circuit allowing capacitor 90 to charge to a value indicating the potential of the photovoltaic chip. The voltage on the capacitor is amplified and inverted and then fed as one input to X comparitor 98.

When the metal plug 62 has rotated to a position proximate to coil 72 along the positive Y axis, in the same way the potential of the photovoltaic chip at that location is sampled, amplified, inverted and fed to Y comparitor 130. In the same manner, as the metal slug 62 is rotated past coils 74 and 76, the potential of the photovoltaic chip is sampled and fed to the X and Y comparitor, respectively. If the output of either the X or Y comparitors is other than zero then the signal from the comparitor activates the appropriate servo motor in the proper direction for moving the base table until the image of the subject hole results in the same voltage being generated by the photovoltaic chip in either the positive or negative coordinate.

Once the center of the subject hole has been achieved, as indicated by a signal light 80 on the operator console or by visual inspection, the coordinates of the centroid are recorded on a recording device 82, such as by tape punch or magnetic recording media.

It is recognized that photo-sensitive elements other than a photovoltaic material may be used in the present invention without departing from its scope. For example, a photo-resistive or photo-conductive material may be used with appropriate biasing means for providing a signal responsive to the amount of light hitting the photo-sensitive element.

It is recognized that it is not necessary for the photo-sensitive element to be positioned at an angle to the line of light of the image of the subject hole. The light source, and the photo-sensitive element may all be aligned on a single central axis without a focusing lens or shutter. In such an instance the direct image of the hole would be focused on the photo-sensitive material.

What I claim is:

1. Apparatus for determining the centroid of a lighted hole comprising:
   a. means for supporting a template containing an image of at least one hole, said means being moveable;
   b. a photo-sensitive element in the form of a strip, illuminations of said photo-sensitive element resulting in an electrical signal dependent upon the amount of light striking said element;
   c. a means for projecting light through a hole in the template so as to strike said photo-sensitive element;
   d. means for rotating said photo-sensitive element about an axis; and
   e. circuit means for sampling the resultant electrical signal at at least a first and second rotational position of said photo-sensitive material, and comparing said signals, said circuit means providing a signal for activating means for moving said supporting means if said first and second signals are not equal.

2. The apparatus of claim 1 in which said signal is sampled at a first position and at a position every 90° of rotation of said photo-sensitive element from said first position. Said signal sampled at said first position being compared with the signal at a second position 180° of rotation from said first position for activating a means for moving said supporting means in a first direction and said signal at a third position 90° from said first position being compared with the signal at a fourth position 270° from said first position for activating means for moving said supporting means in a second direction when said signals at said third and fourth positions are not equal.

3. The apparatus of claim 1 in which the axis about which said photo-sensitive element is rotated is perpendicular to the plane of the surface of the hole in the template.

4. The apparatus of claim 1 in which the axis about which said photo-sensitive element is rotated is at an angle to the axis of the hole in the template.

5. The apparatus of claim 1 in which said strip of photo-sensitive material is rotated about an axis about one end of said strip.

6. The apparatus of claim 5 in which the strip of photo-sensitive material is radially mounted on a support disc.

7. The apparatus of claim 5 in which the image of the hole in the template is focused on the photo-sensitive element, the centroid of the hole being located when the centroid of the image is aligned with the axis of rotation of said strip.

8. The apparatus of claim 5 in which said photo-sensitive element is a photovoltaic material.

* * * * *